United States Patent
Baldasaro et al.

(10) Patent No.: US 9,546,533 B2
(45) Date of Patent: Jan. 17, 2017

(54) HIGH EFFICIENCY RADIATION-INDUCED TRIGGERING FOR SET-ON-COMMAND COMPOSITIONS AND METHODS OF USE

(71) Applicant: Halliburton Energy Services, Inc., Houston, TX (US)

(72) Inventors: Nicholas Baldasaro, Chapel Hill, NC (US); Vijay Gupta, Morrisville, NC (US); Samuel J. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 496 days.

(21) Appl. No.: 14/139,112

(22) Filed: Dec. 23, 2013

(65) Prior Publication Data
US 2014/0209298 A1    Jul. 31, 2014

Related U.S. Application Data

(63) Continuation-in-part of application No. 13/752,421, filed on Jan. 29, 2013.

(51) Int. Cl.
*E21B 33/13* (2006.01)
*E21B 33/14* (2006.01)
(Continued)

(52) U.S. Cl.
CPC .............. *E21B 33/13* (2013.01); *C04B 28/02* (2013.01); *C04B 40/0222* (2013.01);
(Continued)

(58) Field of Classification Search
USPC ........................................ 166/293
See application file for complete search history.

(56) References Cited

U.S. PATENT DOCUMENTS 3,493,529 A * 2/1970 Eilers ................... C04B 28/065
166/293
3,999,096 A    12/1976 Funk et al.
(Continued)

FOREIGN PATENT DOCUMENTS

EP         0393407 A1   10/1990
WO    2011023935 A1    3/2011
(Continued)

OTHER PUBLICATIONS

International Search Report and Written Opinion for PCT/US2014/012538 dated May 23, 2014.
(Continued)

*Primary Examiner* — Cathleen Hutchins
*Assistant Examiner* — Ronald Runyan
(74) *Attorney, Agent, or Firm* — McDermott Will & Emery LLP; Craig Roddy

(57) ABSTRACT

Systems and methods that utilize bremsstrahlung radiation may be used to facilitate the setting of a settable composition. For example, a method may include providing a settable composition in a portion of a wellbore penetrating a subterranean formation, a portion of the subterranean formation, or both; conveying an electron accelerator tool along the wellbore proximal to the settable composition; producing an electron beam in the electron accelerator tool with a trajectory that impinges a converter material, thereby converting the electron beam to bremsstrahlung photons; and irradiating the settable composition with the bremsstrahlung photons.

19 Claims, 3 Drawing Sheets

(51) Int. Cl.
    *E21B 47/10*     (2012.01)
    *C09K 8/467*     (2006.01)
    *C09K 8/50*     (2006.01)
    *C04B 28/02*     (2006.01)
    *C04B 40/02*     (2006.01)
    *B29C 35/08*     (2006.01)
    *C04B 103/00*     (2006.01)

(52) U.S. Cl.
    CPC ............... *C09K 8/467* (2013.01); *C09K 8/50* (2013.01); *E21B 33/14* (2013.01); *E21B 47/1015* (2013.01); *B29C 2035/0877* (2013.01); *C04B 2103/0036* (2013.01)

(56) References Cited

U.S. PATENT DOCUMENTS

| | | |
|---|---|---|
| 4,252,607 A | 2/1981 | Thode |
| 4,490,609 A | 12/1984 | Chevalier |
| 4,547,298 A | 10/1985 | Novak |
| 4,676,832 A | 6/1987 | Childs et al. |
| 4,768,593 A | 9/1988 | Novak |
| 5,191,517 A | 3/1993 | Stephenson |
| 5,422,926 A | 6/1995 | Smith et al. |
| 7,180,981 B2 | 2/2007 | Wang |
| 7,634,059 B2 | 12/2009 | Wraight |
| 7,960,687 B1 | 6/2011 | Simon et al. |
| 8,138,128 B2 | 3/2012 | Lewis et al. |
| 8,143,198 B2 | 3/2012 | Lewis et al. |
| 8,162,057 B2 | 4/2012 | Lewis et al. |
| 8,245,783 B2 | 8/2012 | Lewis et al. |
| 2007/0189459 A1 | 8/2007 | Eaton et al. |
| 2008/0196829 A1 | 8/2008 | Galloway et al. |
| 2009/0090514 A1 | 4/2009 | Bailey et al. |
| 2010/0072405 A1 | 3/2010 | Yu |
| 2011/0048713 A1 | 3/2011 | Lewis et al. |
| 2011/0048715 A1 | 3/2011 | Lewis et al. |
| 2011/0079389 A1 | 4/2011 | MacKay et al. |
| 2011/0204224 A1 | 8/2011 | Yamada et al. |
| 2011/0265996 A1 | 11/2011 | Lewis et al. |
| 2011/0272141 A1 | 11/2011 | Lewis et al. |
| 2011/0272142 A1 | 11/2011 | Lewis et al. |
| 2012/0298354 A1 | 11/2012 | Sullivan et al. |
| 2014/0209298 A1 | 7/2014 | Baldasaro et al. |
| 2014/0209308 A1 | 7/2014 | Baldasaro et al. |

FOREIGN PATENT DOCUMENTS

| | | |
|---|---|---|
| WO | 2014120528 A1 | 8/2014 |
| WO | 2015099875 A1 | 7/2015 |

OTHER PUBLICATIONS

Lebrun, Cryogenic Systems for Accelerators, European Organization for Nuclear Research, 1995.
Siemens Brochure, e-Accelerator—21 MeV, 2007.
International Search Report and Written Opinion for PCT/US2014/061996 dated Feb. 6, 2015.
Supplementary Search Report received in corresponding EP Application No. 14745651, dated Jun. 20, 2016.
Supplementary Search Report received in corresponding EP Application No. 14866791, dated Jun. 21, 2016.

* cited by examiner

HIGH EFFICIENCY RADIATION-INDUCED TRIGGERING FOR SET-ON-COMMAND COMPOSITIONS AND METHODS OF USE

BACKGROUND

The embodiments described herein relate to systems and methods that utilize bremsstrahlung radiation to facilitate the setting of a settable composition.

Natural resources such as oil and gas located in a subterranean formation can be recovered by drilling a wellbore down to the subterranean formation, typically while circulating a drilling fluid in the wellbore. After the wellbore is drilled, a string of pipe (e.g., casing) can be run in the wellbore. The drilling fluid is then usually circulated downwardly through the interior of the pipe and upwardly through the annulus between the exterior of the pipe and the walls of the wellbore, although other methodologies are known in the art.

Hydraulic cement compositions are commonly employed in the drilling, completion and repair of oil and gas wells. For example, hydraulic cement compositions are utilized in primary cementing operations whereby strings of pipe such as casing or liners are cemented into wellbores. In performing primary cementing, a hydraulic cement composition is pumped into the annular space between the walls of a wellbore and the exterior surfaces of a pipe string disposed therein to harden. After the cement is placed within the wellbore, a period of time is needed for the cement to cure and obtain enough mechanical strength for drilling operations to resume. This down time is often referred to as "wait-on-cement", or WOC. The WOC time ranges from a few hours to several days, depending on the difficulty and criticality of the cement job in question. It is desirable to reduce the WOC time, so that the crew can recommence the drilling operation, and thus reduce the total time and cost of operations. If operations are resumed prior to the cement obtaining sufficient mechanical strength, the structural integrity of the cement can be compromised. As such, systems generally are over-engineered to have very long setting (or thickening) times in order to ensure that the mix remains fluid until all of the cementitious material is in place, which can result in excessive WOC.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
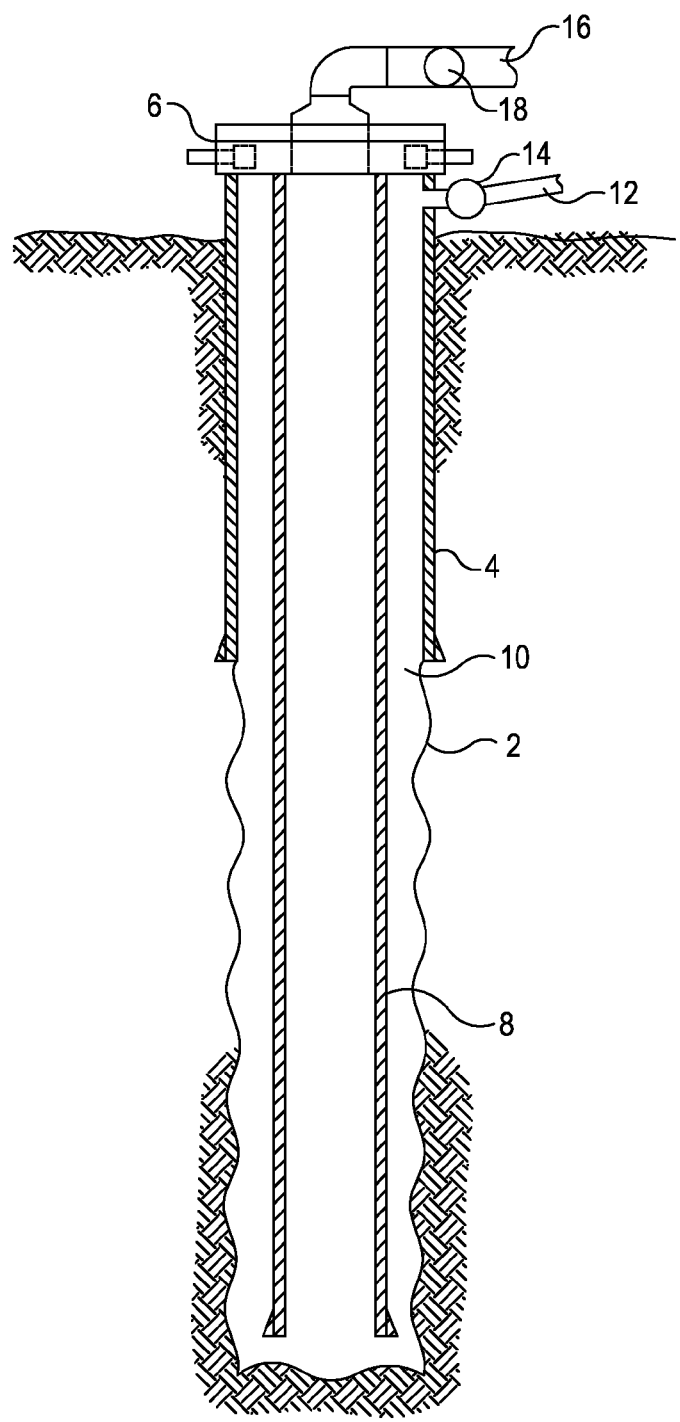
FIG. 1 illustrates a cross sectional side view of a wellbore.

The embodiments described herein relate to systems and methods that utilize bremsstrahlung radiation to facilitate the setting of a settable composition.

The systems and methods described herein use bremsstrahlung photons to set settable compositions (e.g., resins, cements, settable muds, lost circulation fluids, conformance fluids, and combinations thereof). As used herein, the term "set" refers to an increase in mechanical strength of a settable composition (e.g., in a fluid or slurry form) sufficient to perform a desired result, such as to restrict movement of an item or impede fluid flow or pressure transfer through a fluid. In some instances, a cement may be referred to as set when it can restrict the movement of a pipe, or impede fluid flow or pressure transfer, regardless of whether the cement has cured to a fully solid composition. In some instances, a fluid or slurry can be referred to as set when it has thickened to a sufficient level that it achieves the desired result, such as the isolation of a particular zone or the restriction of fluid flow or pressure transfer, regardless of whether it has reached its final consistency.

The use of bremsstrahlung photons may be advantageous in wellbore environments because the production of bremsstrahlung photons can be made more efficient than the production of other ionizing particles like neutrons and protons can be made. Therefore, the amount of energy per particle required to produce bremsstrahlung photons of suitable penetration capability is less, which minimizes the power requirements and heat dissipation. Further, because bremsstrahlung photons are produced from the deceleration of electrons, a precursor fuel, like deuterium or tritium, is not needed. Additionally, high intensities of the bremsstrahlung photons ($10^{14}$ photons per second) can be readily achieved as compared to other ionizing radiations. For example, it is very difficult to produce even $10^{12}$ deuterium-tritium neutrons per second without producing challenging heat loads.

In some embodiments, a settable composition may include set accelerators and set retarders that may be released, activated, or deactivated on-command by irradiation with bremsstrahlung photons. When used in cementing operations in subterranean formations, the settable compositions and bremsstrahlung radiation described herein may advantageously reduce the WOC time, thereby reducing the cost associated with the cementing operation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

FIG. 1 provides a cross-sectional illustration of a system suitable for performing a cementing operation downhole. A surface casing 4, having a wellhead 6 attached, is installed in a wellbore 2. A casing 8 is suspended from the wellhead 6, extends down the wellbore 2, and terminates with an open end (or alternatively includes circulation ports in the walls of casing 8 (not shown)). An annulus 10 is defined between casing 8 and the wellbore 2. An annulus flow line 12 fluidly communicates with annulus 10 through the wellhead 6 and/or surface casing 4 and includes an annulus valve 14. A flow line 16 fluidly communicates with the inner diameter of casing 8 through the wellhead 6 and includes a casing valve 18.

A settable composition may be pumped through the casing 8 and circulated up the annulus 10 while fluid returns are taken from the annulus 10 out the annulus flow line 12, in a typical circulation direction. Alternately, a settable composition can be pumped into the annulus 10 from annulus flow line 12 while fluid returns are taken from the inner diameter of casing 8 through the flow line 16. Thus, fluid flows through wellbore 2 in a reverse circulation direction.

In an alternate method a settable composition can be placed within the wellbore 2 and a sealed or filled tubular can be lowered into the wellbore 2 such that the settable composition is displaced into the annulus 10 area, thereby placing the settable composition within the annulus 10 without pumping the settable composition into the annulus 10. The above method can be referred to as puddle cementing. In some instances, the settable composition can be a drilling fluid placed or left within the wellbore after drilling operations are complete.

In some embodiments, the settable composition is subjected to a dose of radiation from bremsstrahlung photons. Bremsstrahlung radiation, or simply bremsstrahlung, is electromagnetic radiation (e.g., photons) produced by the deceleration or deflection of charged particles (e.g., electrons) passing through matter (e.g., a high-Z material) for example by interacting with the strong electric fields of atomic nuclei. Bremsstrahlung radiation produces a continuous photon energy spectrum (i.e., the resulting photons cover a whole range of energy, from a maximum value downward through lower values all the way to zero). In generating bremsstrahlung, some electrons that collide with the matter are decelerated to zero kinetic energy by a single head-on collision with a nucleus, and thereby have all their energy of motion converted at once into photon radiation of maximum energy. Other electrons from the same incident beam come to rest after being decelerated many times by the positively charged nuclei. Each deflection and subsequent scattering of the electrons gives rise to a photon of less than maximum energy. The maximum energy of any one bremsstrahlung photon is the original kinetic energy of the incoming charged particle, typically an electron in this embodiment.

Some embodiments described herein may involve irradiating a settable composition with bremsstrahlung photons produced downhole (e.g., with an electron accelerator tool described herein) to facilitate setting of the settable composition. Bremsstrahlung-induced curing is a fast non-thermal process that utilizes highly energetic electrons at controlled doses to produce photons that may be useful in facilitating setting of a settable composition (e.g., for polymerizing and crosslinking polymeric materials).

Figure 2:
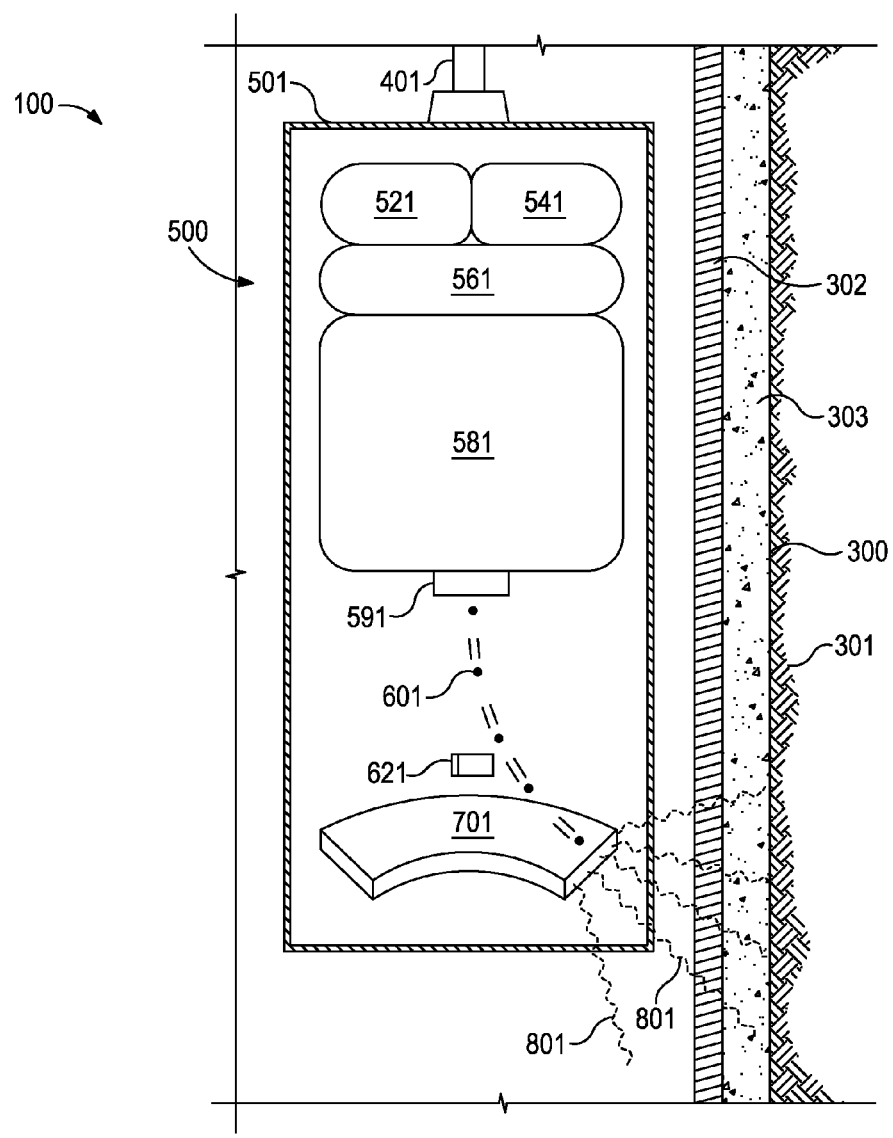
FIG. 2 provides a cross-sectional illustration of a system for producing bremsstrahlung photons downhole in accordance with at least some embodiments described herein.

FIG. 2 provides a cross-sectional illustration of a system 100 for producing bremsstrahlung photons downhole in accordance with at least some embodiments described herein. The system 100 includes an electron accelerator tool 500 coupled to a wireline 401 and disposed in a wellbore 300 penetrating a subterranean formation 301. The wireline 401 may provide electrical power transmission and communications between the electron accelerator tool 500 and the surface of the wellbore. The tool wireline 401 may also bear the mass of the electron accelerator tool 500 during transit up and down the wellbore 300.

The electron accelerator tool 500 comprises a housing 501 for containing at least some of the components of the electron accelerator tool 500. The electron accelerator tool 500 may include accelerator electrical power components 561. The electrical power components 561 may include devices for allocating electrical power from the tool wireline 401 to the various power-using components throughout the electron accelerator tool 500.

The electron accelerator tool 500 may also include cooling components 521 (e.g., cryogenic liquid with insulation) and communication components 541. The communication components 541 may include devices for communicating signals between the electron accelerator tool 500 and the surface of the wellbore.

Electron acceleration components 581 that provide/produce accelerated electrons 601 (also referred to as high energy electrons) may also be included in the electron accelerator tool 500. In some embodiments, a linear acceleration system that uses the abundant linear space within a casing to amplify voltage may be used to produce the accelerated electrons 601. This system, which may be engineered to possess a long, narrow shape makes it amenable to downhole utility. In some embodiments, the accelerator may use radiofrequency ("RF") power to produce the accelerated electrons 601. The accelerator may be linear or a cyclotron accelerator. In some embodiments, some or all of the following components may be operated: a high voltage power supply, a magnetron or klystron, a high voltage switching circuit for pulsing, waveguides for RF transfer, accelerating structures/cavities, an electron gun, electron beam focusing/steering components, an electron beam target, an electron beam dump, radiation shielding, pumps, and plumbing, and the like. In some embodiments, wakefield technology that uses laser pulses to evacuate electrons from small volumes of a solid (e.g., crystals) may be used to produce the accelerated electrons 601.

The devices that comprise the electron acceleration components 581 may vary based on the method of electron acceleration implemented (e.g., linear RF acceleration, cyclotron acceleration, or wakefield acceleration). For example, the electron acceleration components 581 may include lasers, capacitors, diodes, and other devices for producing a plasma, RF induced electromagnetic fields, and the like. In addition, the electron accelerator tool 500, an electron acceleration component 581, or a portion thereof may have a characteristic radius suitable for use in producing an electron beam.

In some embodiments, the accelerated electrons 601 may have an energy ranging from a lower limit of about 0.1 MeV, 0.5 MeV, 1 MeV, or 5 MeV to an upper limit of about 50 MeV, 40 MeV, 30 MeV, 20 MeV, or 10 MeV, wherein the energy of the electrons may range from any lower limit to any upper limit and encompasses any subset therebetween. In some embodiments, the maximum intensity of the electron used produce bremsstrahlung photons may be over $10^{14}$ electrons per second (e.g., up to about $6.25 \times 10^{16}$ electrons per second).

At least one of the electron acceleration components 581 may include an electron beam port 591 where the accelerated electrons are expelled from the electron acceleration component 581 and put on a trajectory to impinge upon a target 701 that converts the accelerated electrons 601 into bremsstrahlung photons 801. In some embodiments, the target 701 may be a converter material (e.g., a high-Z material having an atomic number of 70 and above) within the housing 501. Examples of converter materials may include, but are not limited to, tungsten, tantalum, rhenium, osmium, platinum, thorium, uranium, neptunium, lead, mercury, thallium, gold, iridium, iron, aluminum, tin, and the like, and any combination thereof, including alloys comprising the foregoing. In some embodiments, the target 701 may have a thickness that ranges from a lower limit of about 1 mm, 2 mm, 5 mm, or 10 mm to an upper limit of about 100 mm, 50 mm, 25 mm, 10 mm, or 5 mm, wherein the target thickness may range from any lower limit to any upper limit and encompasses any subset therebetween.

In some embodiments, it may be desirable to create a trajectory for the accelerated electrons 601 whereby they impinge upon the target 701 at angles that are as perpendicular to the casing 302 as feasible. This trajectory may minimize the path length of the bremsstrahlung photons 801 though the casing 302 and to the settable 303. As such, the position of the electron beam port 591 and/or the target 701 may, in some embodiments, be positioned at least substantially parallel to the radial plane of the electron accelerator tool 500 and casing 302 (not shown). In some embodiments, the electron accelerator tool 500 may include an electron beam rastoring device 621 (e.g., an electromagnet) to manipulate the trajectory of the accelerated electrons 601 to depart from straight lines. In some embodiments, permanent magnets may be used to manipulate the electron trajectory, either stationary or moved by a small motor. In some embodiments, the electron accelerator tool 500 may forego the use of the rastoring device 621 and instead align the target 701 with the electron beam port 591 or increase the size of the target 701.

In some embodiments, the electron accelerator tool 500 may be conveyed though the wellbore 300 or portions thereof in order to expose a settable 303 disposed between the casing 302 and the wellbore 300 to bremsstrahlung photons 801.

One skilled in the art will recognize that other configurations of the system 100 may be implemented without departing from the scope of the embodiments described herein.

Figure 3:
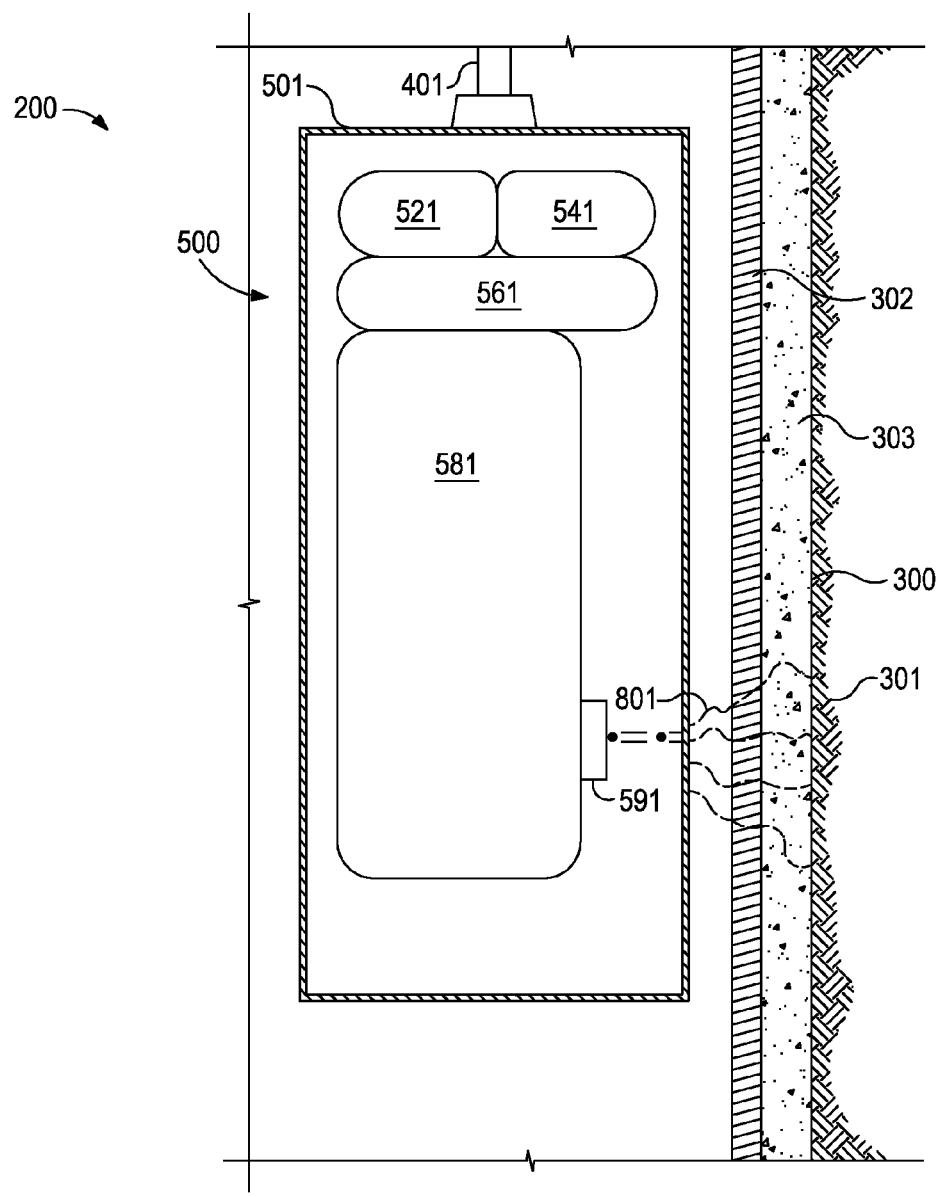
FIG. 3 provides a cross-sectional illustration of a system for producing bremsstrahlung photons downhole in accordance with at least some embodiments described herein.

FIG. 3 provides a cross-sectional illustration of a system 200 for producing bremsstrahlung photons downhole in accordance with at least some embodiments described herein. Similar to the system 100 of FIG. 1, the system 200 includes an electron accelerator tool 500 coupled to a wireline 401. The electron accelerator tool 500 includes a housing 501, a cooling component 521, a communication component 541, an electrical power component 561, an electron acceleration component 581, and an electron beam port 591. However, in FIG. 3, the electron beam port 591 is configured to be parallel to a casing 302 disposed in a wellbore 300 penetrating a subterranean formation 301.

In some embodiments, accelerated electrons 601 produced by the electron acceleration components 581 may impinge the housing 501 and be converted to bremsstrahlung photons 801. In some embodiments, accelerated electrons 601 that pass through the housing 501 without being converted (not shown) may be converted to bremsstrahlung photons 801 by interaction with the drilling mud or the casing 302 (not shown).

The rate of setting for the settable composition may depend on, inter alia, the dose of bremsstrahlung photons experienced by the settable composition. In some embodiments, settable compositions may be subjected to a bremsstrahlung radiation dose ranging from a lower limit of about 1 gray, 10 grays, or 100 grays to an upper limit of about 1000 grays, 750 grays, 500 grays, or 250 grays, wherein the radiation dose may range from any lower limit to any upper limit and encompasses any subset therebetween.

The bremsstrahlung radiation dose depends on the duration and intensity of radiation exposure. The intensity of the bremsstrahlung photons depends on, inter alia, the properties of the electron beam used in the production of the bremsstrahlung photons. In some embodiments, the electron beam and, consequently, the bremsstrahlung photons, may be generated continuously. In some embodiments, the electron beam and the bremsstrahlung photons may be generated in pulses. In either instances, the average current of the electron beam may range from a lower limit of about 10 microamps ("µA"), 50 µA, 100 µA, or 500 µA to an upper limit of about 10 milliamps ("mA"), 5 mA, or 1 mA, wherein the average current of the electron beam may range from any lower limit to any upper limit and encompasses any subset therebetween.

In a pulsed electron beam, the average current depends on the characteristics of the pulses including, but not limited to, the pulse width, the peak current, and the repetition rate (i.e., pulses per second). One skilled in the art will recognize appropriate values for each of these suitable for producing an average current described herein.

The settable compositions that may be set with the systems and methods described herein may include, but are not limited to, cements, sealants, settable muds, lost circulation fluids, conformance fluids, and combinations thereof).

Any cement suitable for use in subterranean applications may be suitable for use in the embodiments described herein. The cementitious compositions disclosed herein generally include water and a cement component (e.g., a hydraulic cement that can include calcium, aluminum, silicon, oxygen, and/or sulfur that sets and hardens by reaction with the water). As used herein, the term "cementitious composition" encompasses pastes (or slurries), mortars, grouts (e.g., oil well cementing grouts), shotcrete, and concrete compositions including a hydraulic cement binder. The terms "paste," "mortar," and "concrete" are terms of art: "pastes" are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand); and "concretes" are mortars additionally including coarse aggregate (e.g., crushed rock or gravel). The cement compositions described herein may be formed by mixing required amounts of certain materials (e.g., a hydraulic cement, water, and fine and/or coarse aggregate) as may be required for making a particular cementitious composition.

Examples of hydraulic cements may include, but are not limited to, Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust, or blast furnace slag also may be suitable for use in the some embodiments described herein. In certain embodiments, the shale may include vitrified shale. In certain other embodiments, the shale may include raw shale (e.g., unfired shale), or a mixture of raw shale and vitrified shale.

In some embodiments, a cementitious composition described herein may include a polymerizable additive capable of undergoing polymerization when subjected to radiation. In some embodiments, the polymerizable additive may be present in an amount ranging from a lower limit of about 0.01%, 0.1%, 1%, or 5% by weight of the cement composition to an upper limit of about 25%, 15%, or 10% by weight of the cement composition, wherein the amount of polymerizable additive may range from any lower limit to any upper limit and encompasses any subset therebetween.

Examples of polymerizable additive may include, but are not limited to, alkeneoxides, vinyl pyrrolidones, vinyl alcohols, acrylamides, vinyl methyl ethers, isobutylenes, fluoroelastomers, esters, tetrafluoroethylenes, acetals, propylenes, ethylenes, methylpentenes, methylmethacrylates, fluorinated ethylene propylenes, and the like, any derivative thereof, and any combination thereof.

In some embodiments, a cementitious composition described herein may also include a crosslinking agent capable of crosslinking a polymer formed by the polymerization of the polymerizable additive. Examples of crosslinking agent may include, but are not limited to, poly(ethylene glycol)diacrylates, poly(ethylene glycol) dimethacrylates, trimethylolpropane triacrylates (TMPTA), ethoxylated TMPTAs, trimethylolpropane trimethacrylates, trimethylolpropanetriacrylates, hexanediol diacrylates, N,N-methylene bisacrylamides, hexanedioldivinylethers, triethyleneglycol diacrylates, pentaeritritoltriacrylates, tripropyleneglycol diacrylates, 1,3,5-triallyl-1,3,5-triazine-2,4,6(1H,3H,5H)-triones, 2,4,6-triallyloxy-1,3,5-triazines, alkoxylated bisphenol A diacrylates, and the like, any derivative thereof, and any combination thereof.

In some embodiments, a cementitious composition described herein may also include a set retarder that lengthens the setting time of the cementitious composition. In some instances, these set retarders allow a cementitious composition to be pumped along long distances without the effect of premature setting. In some embodiments, the set retarders may be present in an amount ranging from a lower limit of about 0.01%, 0.1%, or 1% by weight of the cement composition to an upper limit of about 10%, 5%, or 1% by weight of the cement composition, wherein the amount of the set retarders may range from any lower limit to any upper limit and encompasses any subset therebetween.

Examples of set retarders may include, but are not limited to, phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, borate compounds, and the like, any derivative thereof, and any combination thereof. In some embodiments, the set retarders may include phosphonic acid derivatives, such as those described in U.S. Pat. No. 4,676,832. Examples of suitable borate compounds may include, but are not limited to, sodium tetraborate and potassium pentaborate. Examples of suitable organic acids may include, but are not limited to, gluconic acid and tartaric acid.

In some embodiments, the set retarders may include a sensitizer-containing retarder (e.g., a boron-containing retarder), also referred to as a sensitized retarder. In some embodiments, the sensitizer may comprise a material having a strong radiation absorption property. In some embodiments, the sensitizer may be a scintillator material. In some embodiments, the sensitizer may be any material that increases the capture efficiency of the bremsstrahlung radiation within the cementitious composition. In some embodiments, the sensitizer may be a boron-containing retarder, also referred to as a boronated retarder. Examples of boronated retarders may include boronated versions of the set retarders described above (e.g., a boronated sugar, a boronated carbohydrate, a boronated glucose (e.g., 3-o-(o-carborany-1-ylmethyl)-D-glucose presented in U.S. Pat. No. 5,466,679), and the like).

In some embodiments, a cementitious composition described herein may include a set accelerator. As used herein, the term "set accelerator" can include any component, which reduces the setting time of a settable composition.

In some embodiments, the set accelerators may be present in an amount ranging from a lower limit of about 0.1%, 1%, or 5% by weight of the cement composition to an upper limit of about 20%, 15%, or 10% by weight of the cement composition, wherein the amount of the set accelerators may range from any lower limit to any upper limit and encompasses any subset therebetween.

Examples of set accelerators may include, but are not limited to, alkali and alkali earth metal salts (e.g., calcium salts like calcium formate, calcium nitrate, calcium nitrite, and calcium chloride), silicate salts, aluminates, amines (e.g., triethanolamine), and the like, any derivative thereof, and any combination thereof.

In some embodiments, a cementitious composition described herein may include oxidizing agents that degrade or otherwise deactivate the set retarder. In some embodiments, the oxidizing agents may be present in an amount ranging from a lower limit of about 0.1%, 1%, or 5% by weight of the cement composition to an upper limit of about 20%, 15%, or 10% by weight of the cement composition, wherein the amount of the oxidizing agents may range from any lower limit to any upper limit and encompasses any subset therebetween.

Examples of oxidizing agents may include, but are not limited to, alkaline earth and zinc salts of peroxide, perphosphate, perborate, percarbonate; calcium peroxide, calcium perphosphate, calcium perborate, magnesium peroxide, magnesium perphosphate, zinc perphosphate; calcium hypochlorite, magnesium hypochlorite, chloramine T, trichloroisocyanuric acid, trichloromelamine, dichloroisocynaurate dihydrate, anhydrous dichloroisocyanurate; and the like, any derivative thereof, and any combination thereof.

In some embodiments, a settable composition described herein may be a sealant (e.g., a hardenable resin composition that comprises a liquid hardenable resin and a hardening agent).

Selection of a suitable liquid hardenable resins may be affected by the temperature of the subterranean formation to which the composition will be introduced. By way of example, for subterranean formations having a bottom hole static temperature ("BHST") ranging from about 60° F. to about 250° F., two-component epoxy-based resins comprising a hardenable resin component and a hardening agent component in conjunction with specific hardening agents may be preferred. For subterranean formations having a BHST ranging from about 300° F. to about 600° F., a furan-based resin may be preferred. For subterranean formations having a BHST ranging from about 200° F. to about 400° F. either a phenolic-based resin or a one-component high-temperature epoxy-based resin may be suitable. For subterranean formations having a BHST of at least about 175° F., a phenol/phenol formaldehyde/furfuryl alcohol resin may also be suitable.

In some embodiments, the liquid hardenable resins may be included in the hardenable resin compositions described herein in an amount ranging from a lower limit of about 20%, 30%, 40%, 50%, 60%, 70%, or 75% by volume of the hardenable resin composition to an upper limit of about 90%, 80%, or 75% by volume of the hardenable resin composition, and wherein the amount may range from any lower limit to any upper limit and encompasses any subset therebetween. It is within the ability of one skilled in the art with the benefit of this disclosure to determine how much of the liquid hardenable resin may be needed to achieve the desired results, which may depend on, inter alia, the composition of liquid hardenable resin, the composition of the hardening agent, and the relative ratios thereof.

As used herein, the term "hardening agent" refers to any substance capable of transforming the liquid hardenable resin into a hardened, consolidated mass. Examples of suitable hardening agents may include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic acids, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, polyethyleneimines, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Examples of commercially available hardening agents may include, but are not limited to ETHACURE®100 (75%-81% 3,5-diethyltoluene-2,4-diamine, 18%-20% 3,5-diethyltoluene-2,6-diamine, and 0.5%-3% dialkylated m-phenylenediamines, available from Albemarle Corp.) and JEFFAMINE®D-230 (a polyetheramine, available from Huntsman Corp.).

In some embodiments, the hardening agent may comprise a mixture of hardening agents selected to impart particular qualities to the resin-based sealant composition. For example, in particular embodiments, the hardening agent may comprise a fast-setting hardening agent and a slow-setting hardening agent. As used herein, the terms "fast-setting hardening agent" and "slow-setting hardening agent" do not imply any specific rate at which the agents set a hardenable resin; instead, the terms merely indicate the relative rates at which the hardening agents initiate hardening of the resin. Whether as particular hardening agent is considered fast-setting or slow-setting may depend on the other hardening agent(s) with which it is used. In a particular embodiment, ETHACURE®100 may be used as a slow-setting hardening agent in combination with JEFFAMINE®D-230 as a fast-setting hardening agent. In some embodiments, the ratio of fast-setting hardening agent to slow-setting hardening agent may be selected to achieve a desired behavior of liquid hardening agent component. For example, in some embodiments, the fast-setting hardening agent may be at a ratio of approximately 1:5 by volume with the slow-setting hardening agent. With the benefit of this disclosure, one of ordinary skill in the art should be able to select the appropriate ratio of hardening agents for use in a particular application.

In some embodiments, the hardening agent may be included in the hardenable resin compositions in an amount sufficient to at least partially harden the liquid hardenable resin. In some embodiments, the hardening agents may be included in the hardenable resin compositions described herein in an amount ranging from a lower limit of about 1%, 5%, 10%, 25%, or 50% by volume of the liquid hardening agent to an upper limit of about 100%, 75%, or 50% by volume of the liquid hardening agent, and wherein the amount may range from any lower limit to any upper limit and encompasses any subset therebetween.

In some embodiments, the hardenable resin compositions may further comprise at least one of a solvent (e.g., an aqueous diluent or carrier fluid), a silane coupling agent, an accelerator, and any combination thereof.

In some embodiments, a solvent may be added to the hardenable resin compositions to reduce its viscosity for ease of handling, mixing and transferring. However, in particular embodiments, it may be desirable not to use such a solvent for environmental or safety reasons. It is within the ability of one skilled in the art with the benefit of this disclosure to determine if and how much solvent may be needed to achieve a viscosity suitable to the subterranean conditions of a particular application. Factors that may affect this decision include geographic location of the well, the surrounding weather conditions, and the desired long-term stability of the resin-based seal resulting from setting of the hardenable resin compositions.

Generally, any solvent that is compatible with the liquid hardenable resin and that achieves the desired viscosity effect (e.g., degree of hardening) may be suitable for use in the hardenable resin composition. Suitable solvents may include, but are not limited to, polyethylene glycol, butyl lactate, dipropylene glycol methyl ether, dipropylene glycol dimethyl ether, dimethyl formamide, diethylene glycol methyl ether, ethyleneglycol butyl ether, diethyleneglycol butyl ether, propylene carbonate, d-limonene, fatty acid methyl esters, reactive diluents, and combinations thereof. Selection of an appropriate solvent may be dependent on the compositions of the liquid hardenable resin, the concentration of the liquid hardenable resin, and the composition of the hardening agent. With the benefit of this disclosure, the selection of an appropriate solvent should be within the ability of one skilled in the art. In some embodiments, the solvent may be included in the hardenable resin compositions in an amount ranging from a lower limit of about 0.1%, 1%, or 5% by weight of the liquid hardenable resin to an upper limit of about 50%, 40%, 30%, 20%, or 10% by weight of the liquid hardenable resin, and wherein the amount may range from any lower limit to any upper limit and encompasses any subset therebetween. Optionally, the liquid hardenable resin component may be heated to reduce its viscosity, in place of, or in addition to using a solvent.

In some embodiments, the hardenable resin compositions described herein may comprise an accelerator, which accelerates (e.g., via catalysis) the onset and duration of hardening of the hardenable resin compositions to the resin-based sealant composition. Suitable accelerators may include, but are not limited to, organic or inorganic acids like maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), phenols, tertiary amines (e.g., 2,4,6-tris(dimethylaminomethyl)phenol, benzyl dimethylamine, and 1,4-diazabicyclo[2.2.2]octane), imidazole and its derivatives (e.g., 2-ethyl,-4-methylimidazole, 2-methylimidazole, and 1-(2-cyanoethyl)-2-ethyl-4-methylimidazole), Lewis acid catalysts (e.g., aluminum chloride, boron trifluoride, boron trifluoride ether complexes, boron trifluoride alcohol complexes, and boron trifluoride amine complexes), and the like, and any combination thereof.

Some embodiments may involve introducing a settable composition described herein into a wellbore penetrating a subterranean formation; placing the settable composition in a portion of the wellbore, a portion of the subterranean formation, or both; subjecting the settable composition to bremsstrahlung photons at a radiation dose of about 1 gray to about 1000 grays; and setting the settable composition therein. Some embodiments for isolating a wellbore or a portion of a wellbore may include pumping a settable composition containing a polymerizable additive into a wellbore penetrating a subterranean formation; subjecting the settable composition to bremsstrahlung photons at a radiation dose of about 1 gray to about 1000 grays; and setting the settable composition therein.

Some embodiments may include preparing a cement composition comprising: hydraulic cement, a polymerizable additive, and sufficient water to form a slurry; placing the cement composition into the wellbore; and subjecting the cement composition to bremsstrahlung photons at a radiation dose of from about 1 gray to about 1000 grays to activate setting of the cement composition. In some embodiments, additives like a set retarder, a set accelerator, an oxidizing agent, or combinations thereof may be added to the cement mixture, each independently before or after the water is added to the mixture or during mixing.

In some embodiments, a settable composition described herein may include a set retarder, a set accelerator, and an oxidizing agent. In some embodiments, upon being exposed to the bremsstrahlung radiation, both the set accelerator and oxidizer may be released or otherwise activated. The simultaneous deactivation of the set retarder by the oxidizer and the acceleration of cement hydration by the set accelerator provide a rapid setting time.

Embodiments disclosed herein include:

A. a method that includes providing a settable composition in a portion of a wellbore penetrating a subterranean formation, a portion of the subterranean formation, or both; conveying an electron accelerator tool along the wellbore proximal to the settable composition; producing an electron beam in the electron accelerator tool with a trajectory that impinges a converter material, thereby converting the electron beam to bremsstrahlung photons; and irradiating the settable composition with the bremsstrahlung photons;

B. a method that includes providing a settable composition in a portion of a wellbore penetrating a subterranean formation, a portion of the subterranean formation, or both; conveying an electron accelerator tool along the wellbore proximal to the settable composition; producing a pulsed electron beam in the electron accelerator tool with a trajectory that impinges a converter material, thereby converting the pulsed electron beam to bremsstrahlung photons, wherein the pulsed electron beam has an average current of about 10 microamps to about 10 milliamps; and irradiating the settable composition with the bremsstrahlung photons; and C. a method that includes providing a settable composition in a portion of a wellbore penetrating a subterranean formation, a portion of the subterranean formation, or both; conveying an electron accelerator tool along the wellbore proximal to the settable composition; producing an electron beam in the electron accelerator tool with a trajectory that impinges a converter material that is a portion of a housing of the electron accelerator tool, thereby converting the electron beam to bremsstrahlung photons, wherein the electron beam has an average current of about 10 microamps to about 10 milliamps; and irradiating the settable composition with the bremsstrahlung photons.

Each of embodiments A, B, and C may have one or more of the following additional elements in any combination (unless already provided for): Element 1: the method further including manipulating the trajectory of the electron beam with a rastoring device; Element 2: wherein the electron beam is continuous; Element 3: wherein the electron beam is pulsed; Element 4: wherein the electron beam comprises electrons having an energy of about 0.5 MeV to about 50 MeV; Element 5: wherein the electron beam has an average current of about 10 microamps to about 10 milliamps; Element 6: wherein the converter material comprises at least one of: tungsten, tantalum, rhenium, osmium, platinum, thorium, uranium, neptunium, lead, mercury, thallium, gold, iridium, iron, aluminum, tin, and any combination thereof; Element 7: wherein the converter material comprises a material having an atomic number greater than 70; Element 8: wherein the converter material is a portion of a housing of the electron accelerator tool; Element 9: wherein the converter material has a thickness of about 1 mm to about 1 cm; Element 10: wherein the converter material is a portion of a casing disposed in the wellbore, and wherein the settable composition is disposed within an annulus of the casing and the wellbore; Element 11: wherein the settable composition is a cement; Element 12: wherein the settable composition is a sealant; Element 13: wherein the settable composition is at least one of: a settable mud, a lost circulation fluid, a conformance fluid, and any combination thereof; and Element 14: wherein the settable composition comprises at least one of: a set accelerator, a set retarder, a polymerizable additive, an oxidizing agent, and any combination thereof.

By way of non-limiting example, exemplary combinations applicable to A, B, C include:

Element 1 in combination with one of Elements 2-3; at least one of Elements 4-5 in combination with one of Elements 2-3; at least one of Elements 6-7 in combination with one of Elements 2-3 and optionally in combination with Element 1; Element 9 in combination with at least one of Elements 6-7; Element 9 in combination with one of Elements 2-3 and optionally in combination with Element 1; Element 8 or 10 in combination with any of the foregoing; Element 8 or 10 in combination with at least one of Elements 1-7; Element 8 or 10 in combination with Element 9 and optionally in combination with at least one of Elements 1-7; one of Elements 11-14 in combination with any of the foregoing; two or more of Elements 11-14 in combination; and at least one of Elements 1-14 in combination with at least one of Elements 1-10.

The embodiments described herein may also be useful for or adapted for cement or concrete in other applications, including infrastructure and building materials, where a quick setting time can be obtained with the polymer system. Some specific examples include rapid hardening of pre-cast units such as pipes, panels, and beams, cast in-situ structures for bridges, dams, or roads, quick-set grout, increased adhesion in cement, addition of water-resistant properties to cement, decorative concrete, rapid concrete repair, production of cement board. Other advantages over typical polymer-enhanced concrete systems include the ability to use a wider variety of polymer species, including oligomers which are significantly less volatile, combustible and toxic, and the elimination of initiators, which are also toxic to humans and the environment.

To facilitate a better understanding of the embodiments described herein, the following examples of preferred or representative embodiments are given. In no way should the following examples be read to limit, or to define, the scope of the embodiments described herein.

EXAMPLES

Example 1

Cement slurry samples were prepared by mixing the following ingredients: 400 grams of a class H cement (Lafarge, Joppa Ill.), 160 grams of water (w/c=0.40), 8.0% by weight of solids (bwos) acrylamide, 0.42% bwos N,N-methylene-bis-acrylamide as a crosslinker, 0.50% bwos maltodextrin as a set retarder, 0.50% bwos HR®-25 as a set retarder (a high-temperature retarder available from Halliburton Energy Services, Inc.), 0.20% bwos Diutan gum as a rheology modifier, 0.10% bwos $SnCl_2$ as an oxygen scavenger, and 1.0% bwos SYLOID® RAD 2105 silica gel (Grace Performance Chemicals, USA).

The slurry was mixed for 45 seconds on a Waring blade mixer as per the API mixing schedule. The slurry was split into two samples. One sample was exposed for 20 seconds to bremsstrahlung radiation produced by focusing an electron beam of 5-6 MeV energy onto a tungsten target and placing the sample in a vial at the other end of the tungsten target and thereby exposing the sample to the bremsstrahlung photons. The other sample was not irradiated and kept as a control. The control sample remained fluid. The irradiated sample had been crosslinked and displayed a free-standing solid-like behavior.

Example 2

A cement/sand slurry was prepared similar to that of Example 1, except that the 1% SYLOID RAD particles were not included, and 200 grams of the class H cement was replaced with 200 mesh sand for a 50:50 mixture of cement and silica flour.

The slurry was mixed for 45 seconds on a Waring blade mixer as per the API mixing schedule. The slurry was split into two samples. One sample was exposed for 30 seconds to bremsstrahlung radiation produced by focusing an electron beam of 5-6 MeV energy onto a tungsten target and placing the sample in a vial at the other end of the tungsten target and thereby exposing the sample to the bremsstrahlung photons. The other sample was not irradiated and kept as a control. The control sample remained fluid. The irradiated sample had been crosslinked and displayed a free-standing solid-like behavior.

Example 3

Silica flour slurry samples were prepared by mixing the following ingredients: 400 grams of SSA-1 silica flour (Halliburton, Houston, Tex.) 168 grams of water (w/c=0.42), 0.18 wt % $Ca(OH)_2$ per 100 grams water, 8.0% by weight of solids (bwos) acrylamide, 0.42% bwos N,N-methylene-bis-acrylamide as a crosslinker, 0.20% bwos diutan gum as a rheology modifier, and 0.10% bwos $SnCl_2$ as an oxygen scavenger.

The slurry was mixed for 45 seconds on a Waring blade mixer as per the API mixing schedule. The slurry was split into two samples. One sample was exposed for 30 seconds to bremsstrahlung radiation produced by focusing an electron beam of 5-6 MeV energy onto a tungsten target and placing the sample in a vial at the other end of the tungsten target and thereby exposing the sample to the bremsstrahlung photons. The other sample was not irradiated and kept as a control. The control sample remained fluid. The irradiated sample had been crosslinked and displayed a free-standing solid-like behavior.

The samples demonstrate that bremsstrahlung radiation may be utilized to solidify cement by irradiating a sample of polymerizable additive contained in the cement.

Example 4

Cement slurry samples were prepared by mixing the following ingredients: 800 grams of a class H cement, 320 grams of water, 8.0% bwos acrylamide, 0.42% bwos N,N-methylene-bis-acrylamide as a crosslinker, 0.50% bwos maltodextrin as a set retarder, 0.50% bwos HR-25 as a set retarder, 0.20% bwos diutan gum as a rheology modifier, 1.0% bwos $SnCl_2$ as an oxygen scavenger, and 1.0% bwos SYLOID® RAD 2105.

The slurry was mixed for 45 seconds on a Waring blade mixer as per the API mixing schedule and portioned into 1 inch×2 inch plastic vials. The vials were subjected to bremsstrahlung radiation produced by focusing an electron beam of about 5 MeV energy and an average current of 75 μA (5 μs pulse width, 0.05 A peak current, and 300 pulses per second ("pps") duty cycle) that passed through a tungsten target of varying thickness and a ½ inch thick carbon steel pipe. A dosimeter was affixed to the cement vials to measure the radiation dose. Table 1 provides the dose rate (i.e., dose divided by exposure time) for tungsten target thickness of 2 mm to 25 mm that shows as the thickness of the tungsten target increases the dose rate decreases.

TABLE 1

| Run # | Tungsten Target Thickness (mm) | Dose Rate (cGy/sec) |
|---|---|---|
| 1 | 0 | 6593 |
| 2 | 2 | 6690 |
| 3 | 3 | 6669 |
| 4 | 3 | 6535 |
| 5 | 5 | 5059 |
| 6 | 25 | 934 |
| 7 | 25 | 925 |

After exposure to the bremsstrahlung radiation, the samples at (1) the side closest to the radiation and (2) the side furthest from the radiation were analyzed for Shore hardness. Table 2 provides the Shore hardness results.

TABLE 2

| Tungsten Target Thickness (mm) | Exposure Time (seconds) | Shore Hardness (side closest to radiation) | Shore Hardness (side furthest from radiation) |
|---|---|---|---|
| 0 | 3.3 | 73 | 47 |
| 2 | 3.3 | 79 | 68 |
| 2 | 3.3 | 79 | 60 |
| 3 | 3.3 | 79 | 71 |
| 3 | 3.3 | 75 | 71 |
| 3 | 3.3 | 80 | 67 |
| 3 | 3.3 | 75 | 58 |
| 5 | 3.3 | 72 | 66 |
| 10 | 10 | 79 | 57 |
| 25 | 10 | 77 | 64 |
| 25 | 6.6 | * | * |

* Unable to measure because not hardened/set.

This example demonstrates while the dose rate may decrease with increasing tungsten target thickness, the exposure time can be adjusted to provide comparable setting/hardening.

Example 5

Cement slurry samples were prepared by mixing the following ingredients: 800 grams of a class H cement, 320 grams of water, 8.0% bwos acrylamide, 0.42% bwos N,N-methylene-bis-acrylamide as a crosslinker, 0.50% bwos maltodextrin as a set retarder, 0.50% bwos HR-25 as a set retarder, 0.05% bwos diutan gum as a rheology modifier, 1.0% bwos $SnCl_2$ as an oxygen scavenger, and 1.0% bwos SYLOID® RAD 2105.

The slurry was mixed for 45 seconds on a Waring blade mixer as per the API mixing schedule and portioned into 1 inch×2 inch plastic vials. The vials were subjected to bremsstrahlung radiation produced by focusing an electron beam of about 7.5 MeV energy and a varied average current produced by changing the pulse width (0.1 A peak current and 250 pps duty cycle) that passed through a 3 mm tungsten target and a ½ inch thick carbon steel pipe. After exposure to the bremsstrahlung radiation, the samples at (1) the side closest to the radiation and (2) the side furthest from the radiation were analyzed for Shore hardness. Table 3 provides the Shore hardness results.

TABLE 3

| Exposure Time (seconds) | Pulse Width (μs) | Average Current (μA) | Shore Hardness (side closest to radiation) | Shore Hardness (side furthest from radiation) |
|---|---|---|---|---|
| 3 | 4 | 100 | 76 | 47 |
| 12 | 1 | 25 | 90 | 83 |
| 12 | 1 | 25 | 72 | 69 |
| 12 | 1 | 25 | 87 | 71 |
| 6 | 1 | 25 | 78 | 58 |
| 6 | 1 | 25 | 75 | 54 |

The 12 second exposure, 1 μs pulse width as compared to the 3 second exposure, 4 μs pulse width has ¼ the exposure time but 4 times the pulse width, so substantially the same radiation dose. However, the longer exposure time appears to provide improved hardening/setting of the cement slurry.

Example 6

Cement slurry samples were prepared by mixing the following ingredients: 800 grams of a class H cement, 320 grams of water, 8.0% acrylamide, 0.42% bwos N,N-methylene-bis-acrylamide as a crosslinker, 0.50% bwos maltodextrin as a set retarder, 0.50% bwos HR-25 as a set retarder, 0.05% bwos diutan gum as a rheology modifier, 1.0% bwos $SnCl_2$ as an oxygen scavenger, and 1.0% bwos SYLOID® RAD 2105.

The slurry was mixed for 45 seconds on a Waring blade mixer as per the API mixing schedule and portioned into 1 inch×2 inch plastic vials. The vials were subjected to bremsstrahlung radiation produced by focusing an electron beam of about 7.5 MeV energy and a varied average current produced by changing the peak current (4 μs pulse width and 250 pps duty cycle) that passed through a 3 mm tungsten target and a ½ inch thick carbon steel pipe. After exposure to the bremsstrahlung radiation, the samples at (1) the side closest to the radiation and (2) the side furthest from the radiation were analyzed for Shore hardness. Table 4 provides the Shore hardness results.

TABLE 4

| Exposure Time (seconds) | Peak Current (A) | Average Current (μA) | Shore Hardness (side closest to radiation) | Shore Hardness (side furthest from radiation) |
|---|---|---|---|---|
| 3 | 0.10 | 100 | 76 | 62 |
| 3 | 0.10 | 100 | 80 | 63 |
| 3 | 0.10 | 100 | 76 | 64 |
| 3 | 0.10 | 100 | 74 | 64 |
| 3 | 0.10 | 100 | 73 | 59 |
| 2 | 0.025 | 25 | 59 | * |
| 4 | 0.025 | 25 | 74 | 54 |

TABLE 4-continued

| Exposure Time (seconds) | Peak Current (A) | Average Current (μA) | Shore Hardness (side closest to radiation) | Shore Hardness (side furthest from radiation) |
|---|---|---|---|---|
| 4 | 0.025 | 25 | 75 | 56 |
| 6 | 0.025 | 25 | 76 | 59 |
| 12 | 0.025 | 25 | 88 | 73 |

* Unable to measure because not hardened/set.

This example demonstrates that duty cycle tradeoffs towards a greater total number of pulses in combination with a lower peak current (i.e., a lower average current) appears to be advantageous in downhole applications.

Therefore, the embodiments described herein are well adapted to attain the ends and advantages mentioned as well as those that are inherent therein. The particular embodiments disclosed above are illustrative only, as the embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments described herein. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a settable composition in a portion of a wellbore penetrating a subterranean formation, a portion of the subterranean formation, or both;
conveying an electron accelerator tool along the wellbore proximal to the settable composition;
producing an electron beam in the electron accelerator tool with a trajectory that impinges a converter material, thereby converting the electron beam to bremsstrahlung photons,
wherein the converter material comprises at least one of: tungsten, rhenium, osmium, platinum, thorium, uranium, neptunium, lead, mercury, thallium, gold, iridium, iron, aluminum, tin, and any combination thereof; and irradiating the settable composition with the bremsstrahlung photons.

2. The method of claim 1 that further comprises:
manipulating the trajectory of the electron beam with a rastoring device.

3. The method of claim 1, wherein the electron beam is continuous.

4. The method of claim 1, wherein the electron beam is pulsed.

5. The method of claim 1, wherein the electron beam comprises electrons having an energy of about 0.5 MeV to about 50 MeV.

6. The method of claim 1, wherein the electron beam has an average current of about 10 microamps to about 10 milliamps.

7. The method of claim 1, wherein the converter material is a target contained within the electron accelerator tool.

8. The method of claim 1, wherein the converter material is a portion of a housing of the electron accelerator tool.

9. The method of claim 1, wherein the converter material has a thickness of about 1 mm to about 1 cm.

10. The method of claim 1, wherein the converter material is a portion of a casing disposed in the wellbore, and wherein the settable composition is disposed within an annulus of the casing and the wellbore.

11. A method comprising:
providing a settable hydraulic cement composition in a portion of a wellbore penetrating a subterranean formation, a portion of the subterranean formation, or both;
conveying an electron accelerator tool along the wellbore proximal to the settable hydraulic cement composition;
producing a pulsed electron beam in the electron accelerator tool with a trajectory that impinges a converter material, thereby converting the pulsed electron beam to bremsstrahlung photons, wherein the pulsed electron beam has an average current of about 10 microamps to about 10 milliamps; and
irradiating the settable hydraulic cement composition with the bremsstrahlung photons.

12. The method of claim 1, wherein the pulsed electron beam comprises electrons having an energy of about 0.5 MeV to about 50 MeV.

13. The method of claim 1, wherein the pulsed electron beam has an average current of about 10 microamps to about 10 milliamps.

14. The method of claim 1, wherein the converter material comprises at least one of: tungsten, tantalum, rhenium, osmium, platinum, thorium, uranium, neptunium, lead, mercury, thallium, gold, iridium, iron, aluminum, tin, and any combination thereof.

15. The method of claim 1, wherein the converter material is a target contained within the electron accelerator tool.

16. The method of claim 1, wherein the converter material is a portion of a housing of the electron accelerator tool.

17. The method of claim 1, wherein the converter material has a thickness of about 1 mm to about 1 cm.

18. The method of claim 1, wherein the converter material is a portion of a casing disposed in the wellbore, and wherein the settable composition is disposed within an annulus of the casing and the wellbore.

19. A method comprising:
providing a settable composition in a portion of a wellbore penetrating a subterranean formation, a portion of the subterranean formation, or both;
conveying an electron accelerator tool along the wellbore proximal to the settable composition;
producing an electron beam in the electron accelerator tool with a trajectory that impinges a converter material that is a portion of a housing of the electron accelerator tool, thereby converting the electron beam to bremsstrahlung photons, wherein the electron beam has an average current of about 10 microamps to about 10 milliamps; and
wherein the converter material comprises at least one of: tungsten, rhenium, osmium, platinum, thorium, uranium, neptunium, lead, mercury, thallium, gold, iridium, iron, aluminum, tin, and any combination thereof; and
irradiating the settable composition with the bremsstrahlung photons.

* * * * *

UNITED STATES PATENT AND TRADEMARK OFFICE
CERTIFICATE OF CORRECTION

PATENT NO. : 9,546,533 B2  
APPLICATION NO. : 14/139112  
DATED : January 17, 2017  
INVENTOR(S) : Nicholas Baldasaro et al.

Page 1 of 1

It is certified that error appears in the above-identified patent and that said Letters Patent is hereby corrected as shown below:

In the Claims

In Column 18, Line 1:  
Replace "The method of claim 1", with --The method of claim 11--.

In Column 18, Line 4:  
Replace "The method of claim 1", with --The method of claim 11--.

In Column 18, Line 7:  
Replace "The method of claim 1", with --The method of claim 11--.

In Column 18, Line 12:  
Replace "The method of claim 1", with --The method of claim 11--.

In Column 18, Line 14:  
Replace "The method of claim 1", with --The method of claim 11--.

In Column 18, Line 16:  
Replace "The method of claim 1", with --The method of claim 11--.

In Column 18, Line 18:  
Replace "The method of claim 1", with --The method of claim 11--.

Signed and Sealed this  
Eighteenth Day of April, 2017

Michelle K. Lee  
*Director of the United States Patent and Trademark Office*